US011472456B2

(12) United States Patent
Reed

(10) Patent No.: US 11,472,456 B2
(45) Date of Patent: Oct. 18, 2022

(54) DIRECTION CONTROL FOR A MOTOR OF A GATE CROSSING MECHANISM

(71) Applicant: Siemens Mobility, Inc., New York, NY (US)

(72) Inventor: Quinton Reed, Oil City, PA (US)

(73) Assignee: Siemens Mobility, Inc., New York, NY (US)

( * ) Notice: Subject to any disclaimer, the term of this patent is extended or adjusted under 35 U.S.C. 154(b) by 320 days.

(21) Appl. No.: 16/799,895

(22) Filed: Feb. 25, 2020

(65) Prior Publication Data

US 2021/0261179 A1 Aug. 26, 2021

(51) Int. Cl.
*B61L 29/16* (2006.01)
*H02P 23/24* (2016.01)
*B61L 29/04* (2006.01)

(52) U.S. Cl.
CPC ............ *B61L 29/16* (2013.01); *B61L 29/04* (2013.01); *H02P 23/24* (2016.02)

(58) Field of Classification Search
CPC .......... B61L 29/04; B61L 29/16; B61L 29/22; H02P 23/24; H02P 6/22; H02P 6/30
See application file for complete search history.

(56) References Cited

U.S. PATENT DOCUMENTS

| 2008/0246424 | A1 | 10/2008 | Takeuchi et al. |
| 2008/0265816 | A1 | 10/2008 | Takeuchi et al. |
| 2010/0102766 | A1 | 4/2010 | Keren et al. |
| 2016/0344322 | A1 | 11/2016 | Sun et al. |

FOREIGN PATENT DOCUMENTS

| CN | 108798350 A | * 11/2018 |
| CN | 108798350 A | 11/2018 |
| WO | 2019199310 A1 | 10/2019 |

OTHER PUBLICATIONS

Infineon Technologies, IRS2301S, "High and Low Side Driver", International Rectifier, Sep. 30, 2009, URL: https://www.infineon.com/dgdl/auirs2301s.pdf.
Ashutosh M. Bhatt, "Microcontroller-Based DC Motor Controller", [retrieved from internet on Oct. 27, 2021], URL: https://web.archive.org/web/20160428081541, http://electronicsforu.com/electronics-projects/hardware-diy/microcontroller-based-de-motor-controller, published on Apr. 28, 2016 as per Wayback Machine.
Texas Instruments, "L293x Quadruple Half-H Drivers—L293D", Jan. 2016, URL: https://www.ti.com/lit/ds/symlink/l293d.pdf.

* cited by examiner

*Primary Examiner* — Said Bouziane

(57) ABSTRACT

Examples described herein provide a method for direction control of a motor of a gate crossing mechanism. The method includes providing, by a field-effect transistor (FET) driver, a first voltage via a high output to an open contact of a first relay and to a closed contact of a second relay. The first voltage causes a shaft of the motor to turn in a first direction. The method further includes providing, by the FET driver, a second voltage via a low output to a closed contact of the first relay and to an open contact of the second relay. The second voltage causes the shaft of the motor to turn in a second direction opposite the first direction.

13 Claims, 4 Drawing Sheets

DIRECTION CONTROL FOR A MOTOR OF A GATE CROSSING MECHANISM

BACKGROUND

The present invention generally relates to a gate crossing mechanism, and more specifically, to techniques for direction control for a motor of a gate crossing mechanism An intersection where a railway line crosses a road or path is referred to as a level crossing. Level crossings utilize gate crossing mechanisms to control traffic on the road or path when a train or other vehicle is passing through the level crossing. The gate crossing mechanisms prevent vehicles, pedestrians, etc., from crossing the railway line while the gate crossing mechanism is engaged.

SUMMARY

Embodiments of the present invention are directed to direction control for a motor of a gate crossing mechanism.

A non-limiting example method includes providing, by a field-effect transistor (FET) driver, a first voltage via a high output to an open contact of a first relay and to a closed contact of a second relay. The first voltage causes a shaft of the motor to turn in a first direction. The method further includes providing, by the FET driver, a second voltage via a low output to a closed contact of the first relay and to an open contact of the second relay. The second voltage causes the shaft of the motor to turn in a second direction opposite the first direction.

A non-limiting example gate crossing mechanism includes a motor having a first phase, a second phase, and a third phase. The gate crossing mechanism further includes a first relay circuit associated with the first phase. The first relay circuit selectively provides, by a first field-effect transistor (FET) driver, a first voltage via a high output to an open contact of a first relay and to a closed contact of a second relay or a second voltage via a low output to a closed contact of the first relay and to an open contact of the second relay. The gate crossing mechanism further includes a second relay circuit associated with the second phase. The second relay circuit selectively provides, by a second FET driver, the first voltage via a high output to an open contact of a third relay and to a closed contact of a fourth relay or the second voltage via a low output to a closed contact of the third relay and to an open contact of the fourth relay. The gate crossing mechanism further includes a third relay circuit associated with the third phase. The third relay circuit selectively provides, by a third FET driver, the first voltage via a high output to an open contact of a fifth relay and to a closed contact of a sixth relay or the second voltage via a low output to a closed contact of the fifth relay and to an open contact of the sixth relay.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
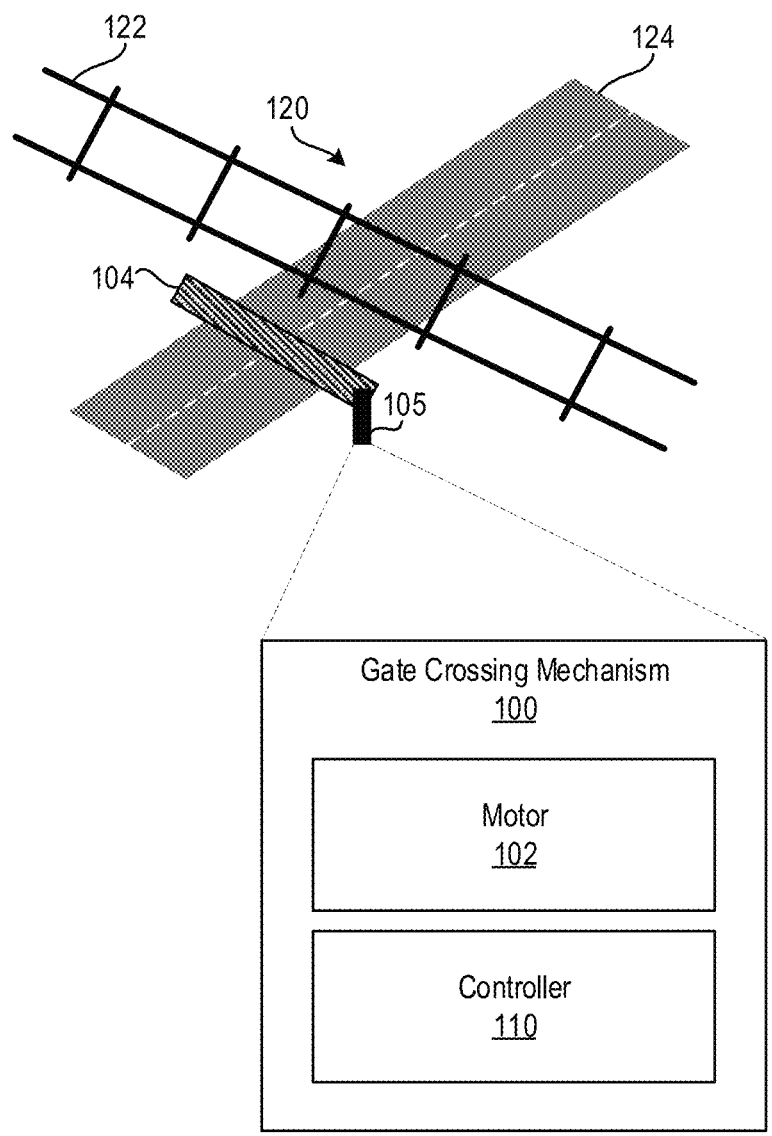
FIG. 1 depicts a block diagram of a processing system for a block diagram of a controller for a motor of a gate crossing mechanism according to one or more embodiments described herein.

The diagrams depicted herein are illustrative. There can be many variations to the diagram or the operations described therein without departing from the scope of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide for a gate crossing mechanism, including techniques for controlling a gate crossing motor and/or detecting and/or preventing faults of the gate crossing motor. A gate crossing mechanism protects motorists, pedestrians, and the like from oncoming trains by blocking level crossings or points at which public or private roads cross railway lines at the same level.

As one example, a gate crossing mechanism can include an arm or "gate" that, using a motor, selectively lowers/raises depending upon whether a train or other vehicle is passing through the level crossing. For example, if a train is approaching a level crossing, a gate can be lowered to prevent traffic on the road or path from crossing the railway line. A level crossing can be equipped with multiple gate crossing mechanisms. For example, each side of the railway line can include a gate crossing mechanism. In larger intersections, each side of the railway line can include two (or more) gate crossing mechanisms. Gate crossing mechanisms can further include lights, sirens, bells, or other similar devices that can provide visual and/or aural warnings.

Conventional gate crossing mechanisms can be susceptible to failures, malfunctions, etc., which can reduce their ability to control a level crossing safely. It is, therefore, desirable to improve efficiency, reliability, and functionality of conventional gate crossing mechanisms.

The above-described aspects of the invention address the shortcomings of the prior art by providing techniques for improving the efficiency, reliability, and functionality of gate crossing mechanisms. Such aspects can include fault detection of a gate crossing motor, overspeed protection of a gate crossing motor, direction control of a gate crossing motor, and thermal lockout of a gate crossing motor.

Gate crossing mechanisms having the features and functionality described herein provide improve efficiency and address problems associated with conventional gate crossing mechanisms. For example, a gate crossing mechanism can include a brushless motor and digital control logic rather than a conventional brushed motor and mechanical cams. Motor brushes can experience uneven wear patterns, after which they must be replaced. This is both costly and time consuming for railways or those responsible for maintaining gate crossing mechanisms featuring brushed motors. Moreover, whereas conventional gate crossing mechanisms having brushed motors required more than two cams, the brushless motors of the gate crossing mechanisms described herein can use substantially less cams (e.g., two cams).

Additionally, the brushless motors of the gate crossing mechanisms described herein provide expanded fault detection such as overcurrent and overtemperature detection, which can be determined from measured three-phase motor currents. This active fault detection serves to increase the availability of the gate crossing mechanism. The brushless motors of the gate crossing mechanisms described herein also provide an improved user interface to give maintainers clear feedback on gate configuration. This improves efficiency and accuracy for maintainers to set gate attributes in the field, thereby decreasing human error. Finally, the brushless motors of the gate crossing mechanisms described herein support a configurable gate that can function as either an entrance or an exit gate, which can depend for example on field-programmable gate array (FPGA) firmware. This is a stark difference from the conventional gate crossing mechanisms, which can only function as an entrance gate unless an additional logic card is attached.

Turning now to FIG. 1, a block diagram of a controller 110 for a motor 102 of a gate crossing mechanism 100 is depicted according to one or more embodiments described herein. In this example, the gate crossing mechanism 100 includes the motor 102, the controller 110, and a gate 104. The gate 104 can be supported by any suitable structure, such as a gate support 105. The controller 110 and/or the motor 102 can be coupled to, incorporated in, or otherwise associated with the gate 104 and/or the gate support 105. The gate crossing mechanism 100 controls the gate 104 at a crossing 120 of a railway 122 and a road 124. The gate 104, when in a "down" or "closed" position, prevents traffic traveling along the road 124 from crossing the intersection 120. In examples, the intersection can be controlled by additional gate crossing mechanisms (not shown).

Figure 2:
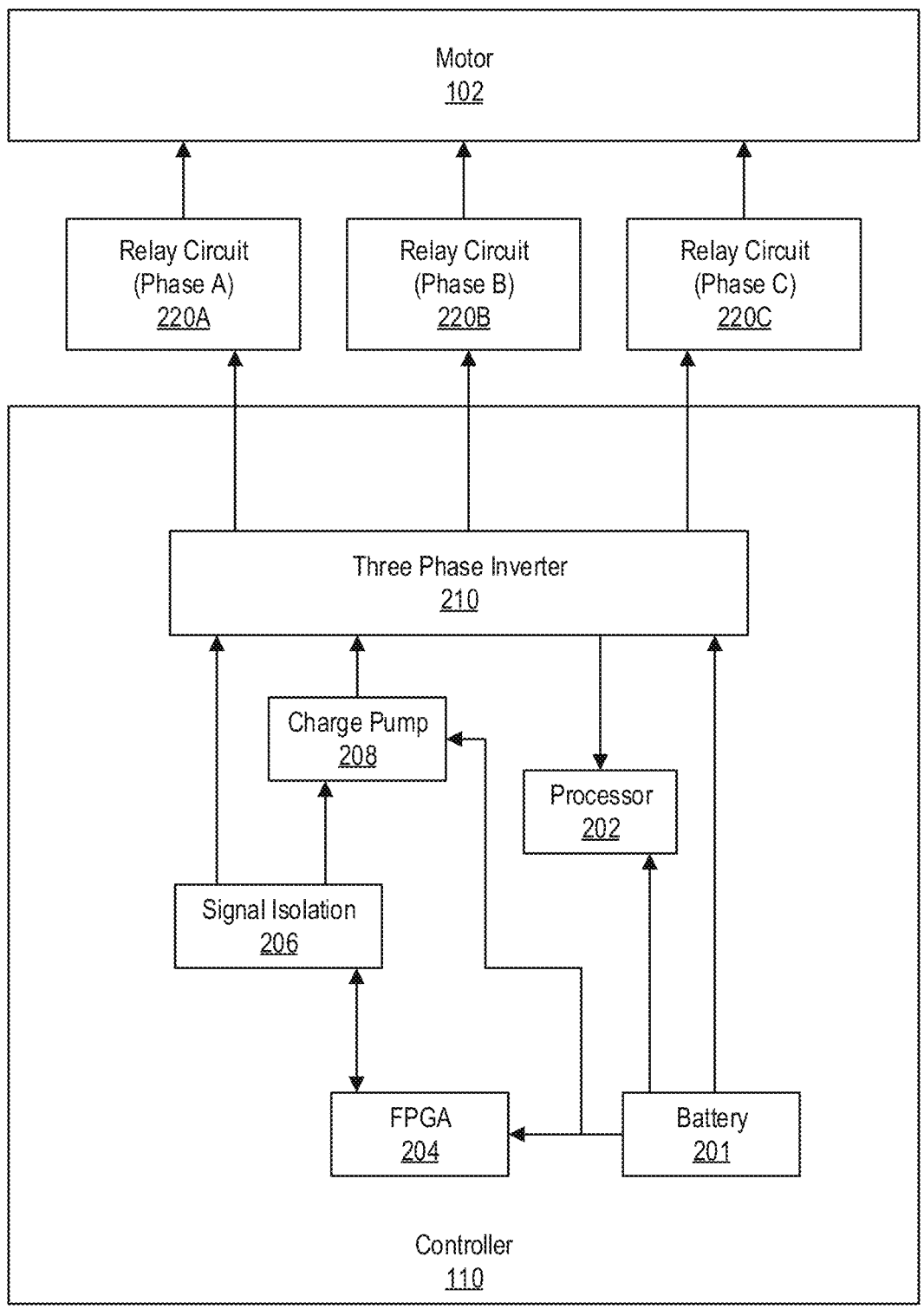
FIG. 2 depicts a block diagram of the controller of FIG. 1 being configured for direction control for the motor of FIG. 1 according to one or more embodiments described herein.

FIG. 2 depicts a block diagram of the controller 110 of FIG. 1 being configured for direction control for the motor 102 of FIG. 1 according to one or more embodiments described herein. According to one or more embodiments described herein, the controller 110 can include various components configured and arranged as shown.

As one example, the controller 110 includes a processor 202, a field-programmable gate array (FPGA) 204, a signal isolation block 206, a charge pump 208, and a three-phase inverter 210. In some examples, the processor 202 includes an analog-to-digital converter (ADC). As shown in FIG. 2, one or more of the processor 202, the FPGA 204, the charge pump 208, and/or the three-phase inverter 210 can be powered by a battery 201, although any suitable power source can be used. The three-phase inverter 210 drives the motor 102 via relay circuits 220A, 220B, 220C for the respective three phases of the motor (e.g., phase A, phase B, phase C).

Conventional motors used in gate crossing mechanisms, such as the gate crossing mechanism 100, rely on software (executed, for example, by a processor or field-programmable gate array) to control the direction of the motor 102. In some error states or fault conditions, the software may not be able to execute. For example, if the processor or FPGA experiences a failure, the software may be unable to control the direction of the motor 102. Accordingly, to provide a more reliable motor, the present techniques provide a hardware-based approach to direction control of a brushless motor (e.g., the motor 102) for a gate crossing mechanism (e.g., the gate crossing mechanism 100)

In particular, according to one or more embodiments described herein, the motor 102 can easily and reliably switch directions by using hardware-based relays. To switch directions in the motor 102, the current in coils of the motor 102 is switched. As an example, consider the motor 102 being a three-phased brushless motor having a phase A, phase B, and phase C. In such an example, hardware-based relays are used to switch the motor direction. If phase A is being driven on the high side (e.g., 12 volts) and phase B is grounded (e.g., 0 volts), then a shaft (not shown) of the motor 102 is rotating in one direction (e.g., clockwise). If the phases are flipped such that phase B is being driven on the high side (e.g., 12 volts) and phase A is grounded (e.g., 0 volts), then the current is reversed in the coils of the motor 102 and the shaft of the motor 102 switches to rotating in the other direction (e.g., counterclockwise). To do this, a relay is added to each phase of the motor 102. For each phase, a normally closed position of the relay and a normally open position of the relay are tied to the high sides and the low sides inversely of each other so that if the relay is sitting normally. For example, if it is desired for the gate 104 to come down in the normally closed contact position of the relay, the high side and the low side gates are set up so that the motor 102 would drive the gate 104 and it would come down. If the relay is energized, the relay flips, on each phase, the high side and the low side, essentially reversing the current in the coils of the motor 102, thus reversing the direction of the motor 102.

According to one or more embodiments described herein, software in the FPGA 204 is configured for one direction of motor rotation. The commutation software is only configured to run the FPGA 204 in a safe direction (e.g., downward for entrance gates and upward for exit gates). The relay circuits 220A, 220B, 220C utilize 3×1 form C relays to control the direction of the motor. Two relays are needed per phase of the motor where each phase is driven through a high and a low side FET driver (e.g., the FET driver U3 of FIG. 3A). For each phase, the high side FET gate is connected to the common connection of a first relay while the low side gate signal is connected to a normally open contact of the first relay and the high side gate signal is connected to the normally closed relay contact of the first relay. For each phase, the low side FET gate is connected to the common connection of a second relay while the low side gate signal is connected to the normally closed contact of the second relay and the high side gate driver signal is connected to the normally open contact of the second relay. The power source for the relay is the power from an isolated gate control (GC) signal received from the controller 110 (e.g., from the three-phase inverter 210) as inputs to the FET gate (see, e.g., inputs 301, 302 of FIG. 3A). When the GC is high, the contacts will flip the high and low side gate signals effectively changing the direction of rotation of a shaft of the motor 102. For example, this could be an upward direction for the gate 104 if the gate crossing mechanism 100 is an entrance gate and downward for the gate 104 if the gate crossing mechanism 100 is an exit gate. If the GC is low then the commutation can only happen in a safe direction. The relay can be of a standard electromechanical relay or a solid-state relay and can be placed before or after the FET driver chip. In an example in which the relay is placed before the FET driver, a smaller load relay could be used (e.g., less than 100 milliamps) whereas placing the relay after the FET driver would use a larger size relay (e.g., about 1 amp).

Figures 3, 3A:
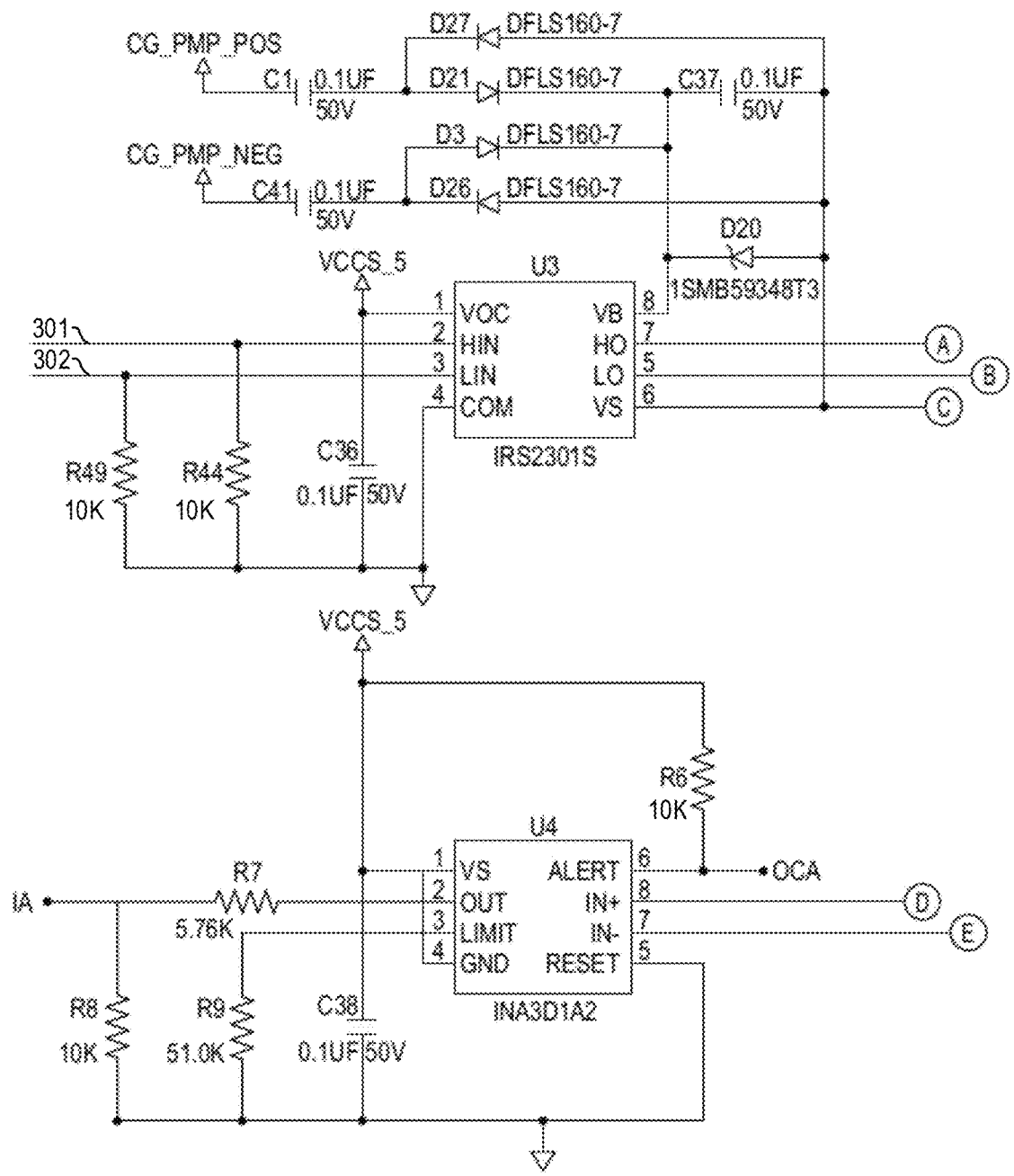
FIGS. 3A and 3B depict a relay circuit for a phase of the motor of FIG. 1 according to one or more embodiments described herein.
Figure 3B:
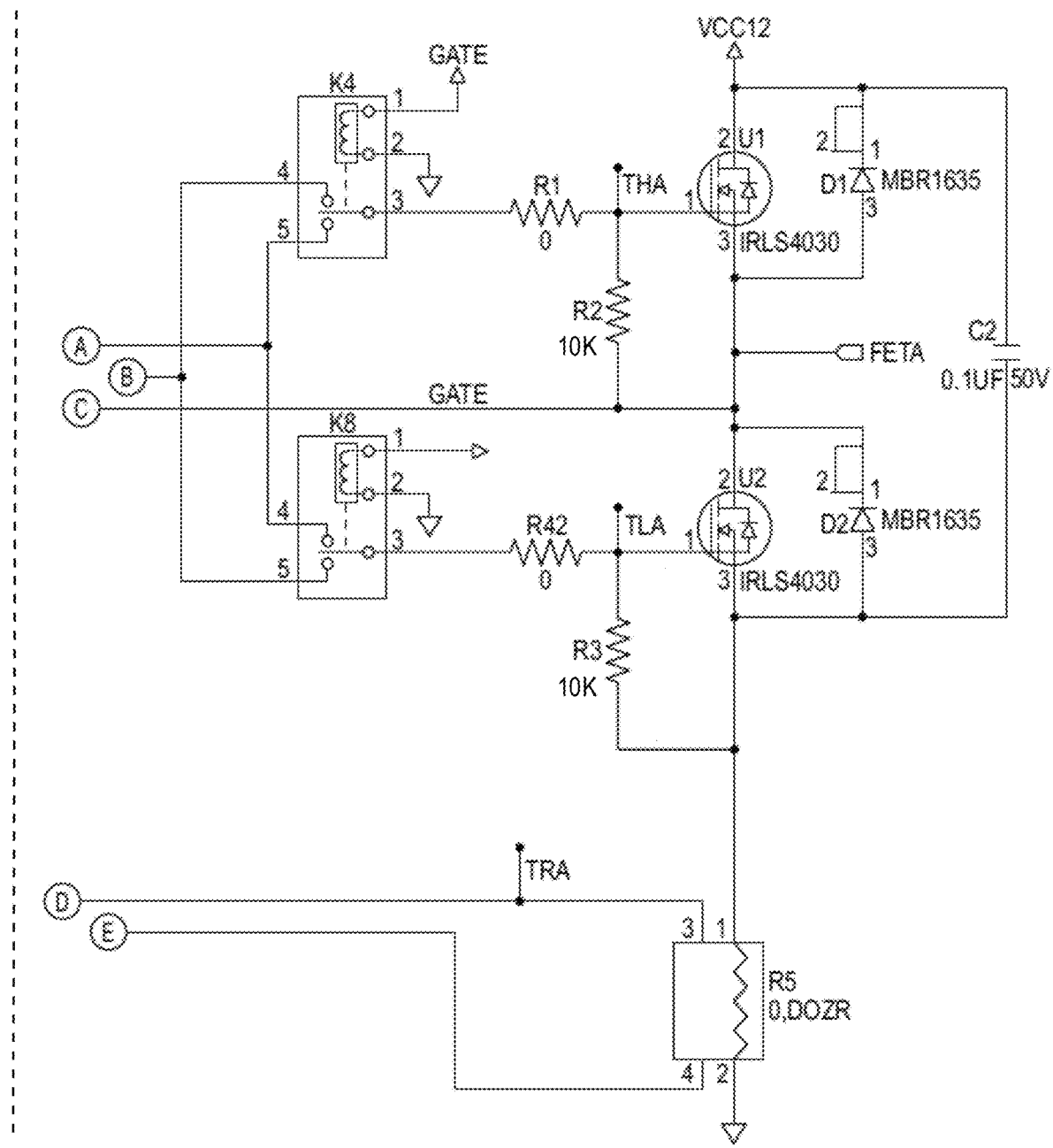

FIGS. 3A and 3B depict the relay circuit 220A of FIG. 2 for controlling a direction of rotation of a shaft of the motor 102 of FIG. 1 according to one or more embodiments described herein. Although the relay circuit 220A is shown, it should be appreciated that the relay circuits 220B, 220C are substantially similar to the relay circuit 220A and are not shown for brevity.

The shaft (not shown) of the motor 102 can rotate in two different directions (e.g., clockwise and counterclockwise).

A field-effect transistor (FET) driver U3 takes as inputs logic level voltages and boosts those voltages to higher current to turn on MOSFETs U1, U2. In particular, the FET driver U3 receives inputs 301, 302 from the three-phase inverter 210 of FIG. 2. The input 301 is a high input signal, and the input 302 is a low input signal. The FET driver U3 also selectively drives relays as shown in FIG. 3B. In particular, the circuit 220 includes two relays K4, K8 (see FIG. 3B). The high output (pin 7) of the FET driver U3 is connected to the normally open contact (pin 5) of the relay K4 and the normally closed contact (pin 4) of the relay K8. Inversely, the low output (pin 5) of the FET driver U3 is connected to the normally closed contact (pin 4) of the relay K4 and the normally open contact (pin 5) of the relay K8.

When the FET driver U3 is selectively driving on the high output (pin 7), current flows through the normally open contact (pin 5) of the relay K4 and the normally closed contact (pin 4) of the relay K8. When the FET driver U3 switches from driving on the high output (pin 7) to driving on the low output (pin 5), current flows through the normally closed contact (pin 4) of the relay K4 and the normally open contact (pin 5) of the relay K8, thereby switching directions of the current flow. Thus, the direction of rotation of a shaft of the motor 102 can be controlled by the FET driver U3 using the relays K4, K8 on phase A of the motor 102. Similar circuits to the circuit 220 can be applied to the other phases (i.e., phase B and phase C as shown in FIG. 2) of the motor 102 to control the direction of rotation of the shaft of the motor 102. In examples, one or more of the relays K4, K8 can be vital relays, which increases reliability versus using non-vital relays. One or more of the relays K4, K8 can be solid-state relays or electromechanical relays.

The embodiments described herein may be implemented as one or more systems, methods, and/or computer program products at any possible technical detail level of integration. The computer program product may include a computer readable storage medium (or media) having computer readable program instructions thereon for causing a processor to carry out aspects of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for direction control of a motor of a gate crossing mechanism, the method comprising:
   receiving, by a field-effect transistor (FET) driver, input signals from a three-phase inverter, the input signals comprising a high input signal and a low input signal,
   providing, by the FET driver, a first voltage via a high output to an open contact of a first relay and to a closed contact of a second relay, wherein the high output is based on the high input signal of the three-phase inverter, the first voltage causing a shaft of the motor to turn in a first direction; and
   providing, by the FET driver, a second voltage via a low output to a closed contact of the first relay and to an open contact of the second relay, wherein the low output is based on the low input signal of the three-phase inverter, the second voltage causing the shaft of the motor to turn in a second direction opposite the first direction.

2. The method of claim 1,
   wherein the three-phase inverter is an element of a controller associated with the motor of the gate crossing mechanism.

3. The method of claim 1,
   wherein the motor is a three-phase motor, and wherein the FET driver, the first relay, and the second relay are associated with one phase of the three-phase motor.

4. The method of claim 1,
   wherein at least one of the first relay or the second relay is an electromechanical relay.

5. The method of claim 1,
   wherein at least one of the first relay or the second relay is a solid-state relay.

6. The method of claim 1,
   wherein the motor is a brushless motor.

7. A gate crossing mechanism comprising:
   a motor comprising a first phase, a second phase, and a third phase;
   a three-phase inverter providing input signals including a high input signal and a low input signal to a first relay circuit, a second relay circuit and a third relay circuit;
   wherein the first relay circuit is associated with the first phase, the first relay circuit selectively receiving the input signals of the three-phase inverter and providing, by a first field-effect transistor (FET) driver,
      a first voltage via a high output to an open contact of a first relay and to a closed contact of a second relay
      or
      a second voltage via a low output to a closed contact of the first relay and to an open contact of the second relay;
   wherein the second relay circuit is associated with the second phase, the second relay circuit selectively receiving the input signals of the three-phase inverter and providing, by a second FET driver,
      the first voltage via a high output to an open contact of a third relay and to a closed contact of a fourth relay
      or
      the second voltage via a low output to a closed contact of the third relay and to an open contact of the fourth relay; and
   wherein the third relay circuit is associated with the third phase, the third relay circuit selectively receiving the input signals of the three-phase inverter and providing, by a third FET driver,
      the first voltage via a high output to an open contact of a fifth relay and to a closed contact of a sixth relay
      or
      the second voltage via a low output to a closed contact of the fifth relay and to an open contact of the sixth relay,
   wherein the high output of the first FET driver, second FET driver or third FET driver is based on the high input signal of the three-phase inverter, and
   wherein the low output of the first FET driver, second FET driver or third FET driver is based on the low input signal of the three-phase inverter.

8. The gate crossing mechanism of claim 7,
   wherein the first voltage causes a shaft of the motor to turn in a first direction.

9. The gate crossing mechanism of claim 8,
   wherein the second voltage causes the shaft of the motor to turn in a second direction.

10. The gate crossing mechanism of claim 7,
    wherein the motor is a brushless motor.

11. The gate crossing mechanism of claim 7,
    wherein at least one of the first relay, the second relay, the third relay, the fourth relay, the fifth relay, or the sixth relay is an electromechanical relay.

12. The gate crossing mechanism of claim 7,
    wherein at least one of the first relay, the second relay, the third relay, the fourth relay, the fifth relay, or the sixth relay is a solid-state relay.

13. The gate crossing mechanism of claim 7,
    further comprising a controller including:
    a processor;
    a field-programmable gate array;
    a signal isolator;
    a charge pump;
    a battery; and
    the three-phase inverter.

* * * * *